(12) United States Patent
Krag

(10) Patent No.: US 6,430,863 B1
(45) Date of Patent: Aug. 13, 2002

(54) FLYING DUCK DECOY SYSTEM

(76) Inventor: Jeffrey B. Krag, 285 Dillard Rd., Rossville, TN (US) 38066

( * ) Notice: Subject to any disclaimer, the term of this patent is extended or adjusted under 35 U.S.C. 154(b) by 0 days.

(21) Appl. No.: 09/716,095

(22) Filed: Nov. 20, 2000

(51) Int. Cl.$^7$ .............................................. A01M 31/06
(52) U.S. Cl. ............................................................ 43/3
(58) Field of Search ............................ 43/2, 3; 119/839; 446/228, 229, 314; 273/359, 362, 366, 367, 459, 460

(56) References Cited

U.S. PATENT DOCUMENTS

| | | | | |
|---|---|---|---|---|
| 740,293 A | * | 9/1903 | Loeble | 43/3 |
| 1,075,518 A | * | 10/1913 | Thresher | 273/359 |
| 1,385,634 A | * | 7/1921 | Marshall | 446/228 |
| 1,788,889 A | * | 1/1931 | Ritchie | 273/366 |
| 2,028,849 A | * | 1/1936 | Shay | 43/3 |
| 2,129,781 A | * | 9/1938 | Park | 43/3 |
| 2,174,211 A | * | 9/1939 | Hutaff, Jr. | 43/3 |
| 3,436,856 A | * | 4/1969 | Miller | 43/3 |
| 3,471,153 A | * | 10/1969 | Baumler | 273/359 |
| 3,736,688 A | * | 6/1973 | Caccamo | 43/3 |
| 3,768,192 A | * | 10/1973 | Caccamo | 43/3 |
| 4,620,385 A | | 11/1986 | Carranza et al. | 43/3 |
| 5,320,572 A | * | 6/1994 | Chen | 446/229 |
| 5,832,649 A | * | 11/1998 | Kilgore | 43/3 |
| 5,862,619 A | | 1/1999 | Stanil | 43/3 |
| 5,956,880 A | * | 9/1999 | Sugimoto | 43/2 |
| 6,044,581 A | * | 4/2000 | Shipman et al. | 43/3 |
| 6,311,425 B1 | * | 11/2001 | Capps | 43/3 |
| 6,357,159 B1 | * | 3/2002 | Bowling | 43/2 |

FOREIGN PATENT DOCUMENTS

| | | | | |
|---|---|---|---|---|
| CA | 655363 B1 | * | 1/1963 | 43/3 |
| GB | 17660 B1 | * | 8/1900 | 43/2 |
| GB | 406386 B1 | * | 3/1934 | 43/2 |
| IT | 471206 B1 | * | 5/1952 | 43/2 |
| SE | 129808 B1 | * | 10/1950 | 43/2 |

* cited by examiner

*Primary Examiner*—Darren W. Ark
(74) *Attorney, Agent, or Firm*—Walker, McKenzie & Walker, PC

(57) ABSTRACT

A duck decoy system for simulating a landing duck. The system includes a duck decoy body; a support member for being positioned above the duck decoy body; and elevator structure for coupling the duck decoy body to the support member and for lowering the duck decoy body downward from the support member to simulate a landing duck.

7 Claims, 4 Drawing Sheets

FLYING DUCK DECOY SYSTEM

CROSS-REFERENCE TO RELATED APPLICATIONS

Not Applicable.

STATEMENT RE FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates, in general, to duck decoy systems and, more specifically, to a decoy system that simulates a landing duck.

2. Information Disclosure Statement

Decoys have long been used by hunters, photographers, bird watchers and the like to lure birds (e.g., ducks and geese) to a given area. In the past, the typical duck decoy consisted of a stationary form having the basic shape or appearance of the duck to be lured. More recently, there have been many duck decoys introduced that have wing movement or the appearance of wing movement to simulate flying ducks.

The inventor is aware of the following patents which appear to be relevant to the present invention:

Carranza et a., U.S. Pat. No. 4,620,385, issued Nov. 4, 1986, discloses a pair of rotatable wings that are slidably and rotatably received and secured on the axle of a bracket carried by a water fowl decoy to extend laterally outwardly from the decoy body.

Stancil, U.S. Pat. No. 5,862,619, issued Jan. 26, 1999, discloses an animated water fowl decoy having a rotating vane with a light side and a dark side to provide the appearance of symmetrical lateral movement.

Nothing in the known prior art discloses or suggests the present invention. More specifically, nothing in the known prior art discloses or suggests a duck decoy system for simulating a landing duck including a duck decoy body; a support member for being positioned above the duck decoy body; and elevator means for coupling the duck decoy body to the support member and for lowering the duck decoy body downward from the support member to simulate a landing duck.

BRIEF SUMMARY OF THE INVENTION

The present invention provides a duck decoy system. A basic concept of the present invention is to provide a duck decoy system in which a duck decoy body moves downward from a support member to simulate a landing duck.

The duck decoy system of the present invention comprises, in general, a duck decoy body; a support member for being positioned above the duck decoy body; and elevator means for coupling the duck decoy body to the support member and for lowering the duck decoy body downward from the support member to simulate a landing duck.

One object of the present invention is to provide a duck decoy system that simulates a landing duck.

Another object of the present invention is to provide such a duck decoy system that simulates one or more ducks landing in timber.

DETAILED DESCRIPTION OF THE INVENTION

Figure 1:
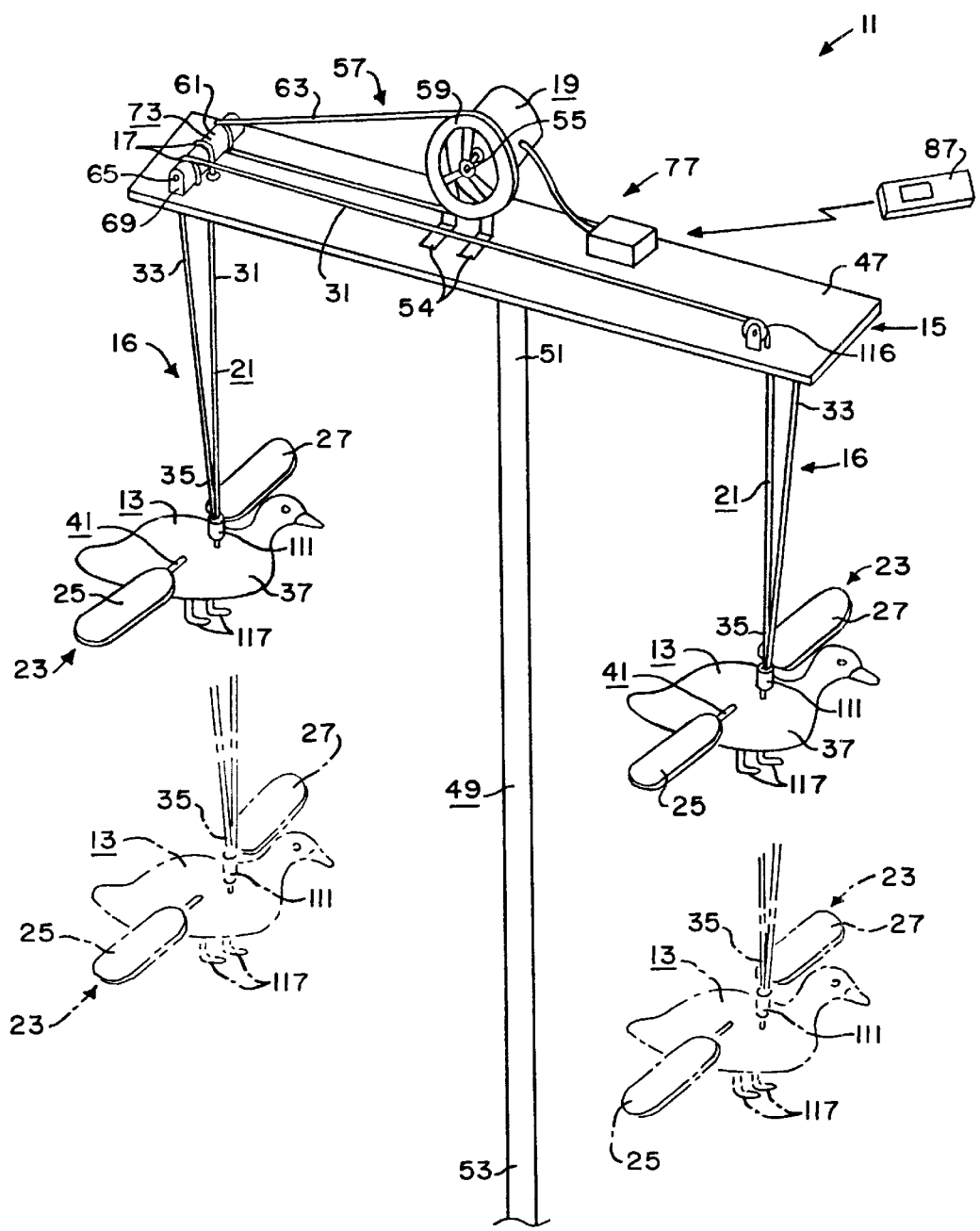
FIG. 1 is a perspective view of a preferred embodiment of the duck decoy system of the present invention, with portions thereof broken away or omitted for clarity.
Figure 2:
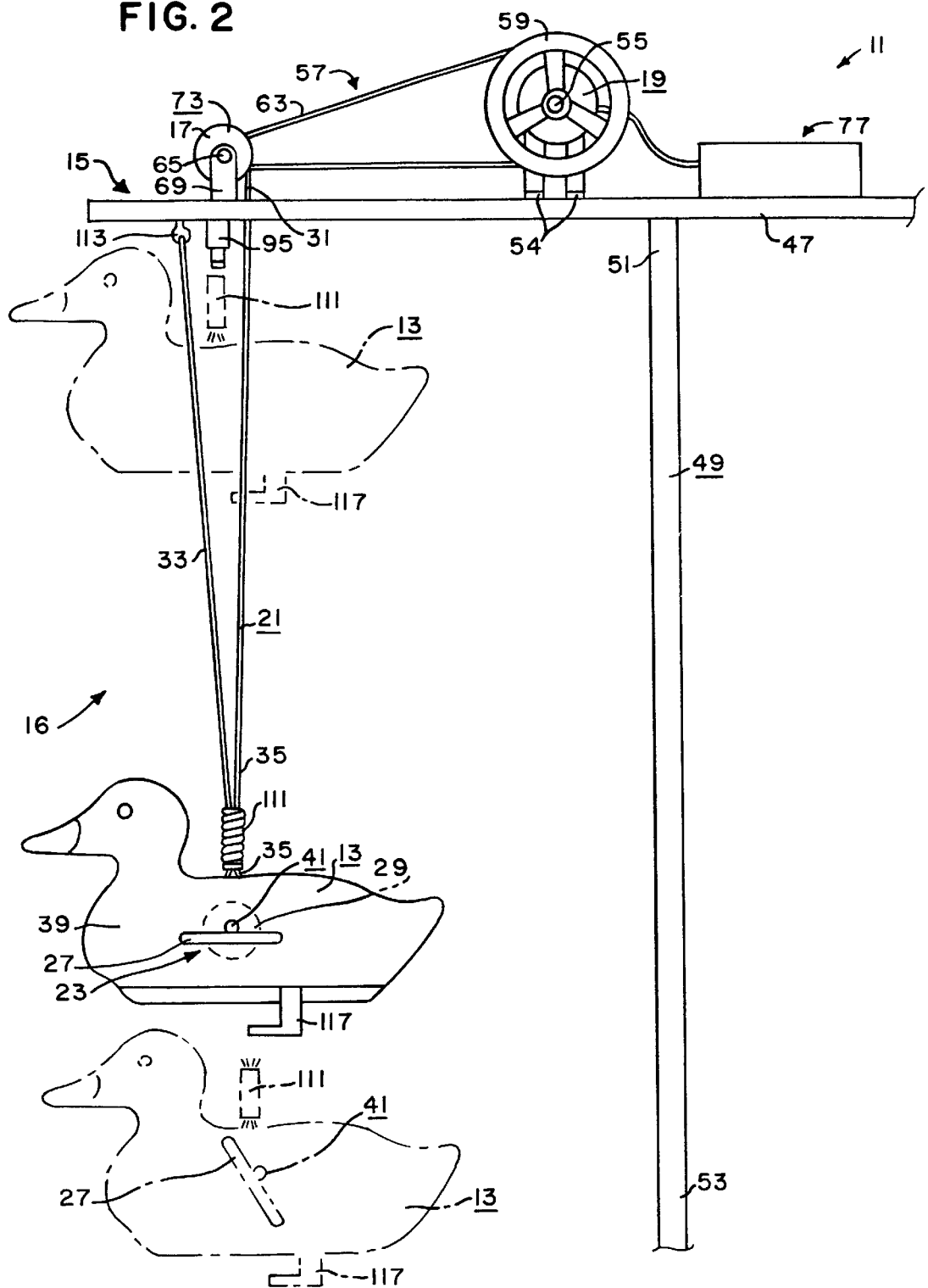
FIG. 2 is a side elevational view of the duck decoy system of the present invention, similar to FIG. 1, but with the duck decoy body facing the opposite direction and with portions thereof broken away or omitted for clarity.
Figure 3:
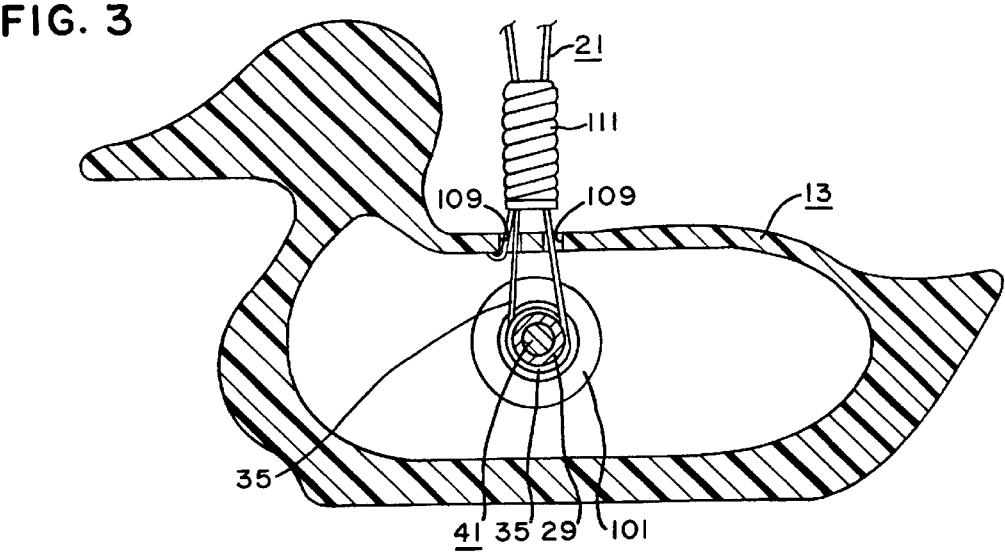
FIG. 3 is a sectional view of a duck decoy body and associated structure of the duck decoy system of the present invention, with portions thereof broken away for clarity.
Figure 4:
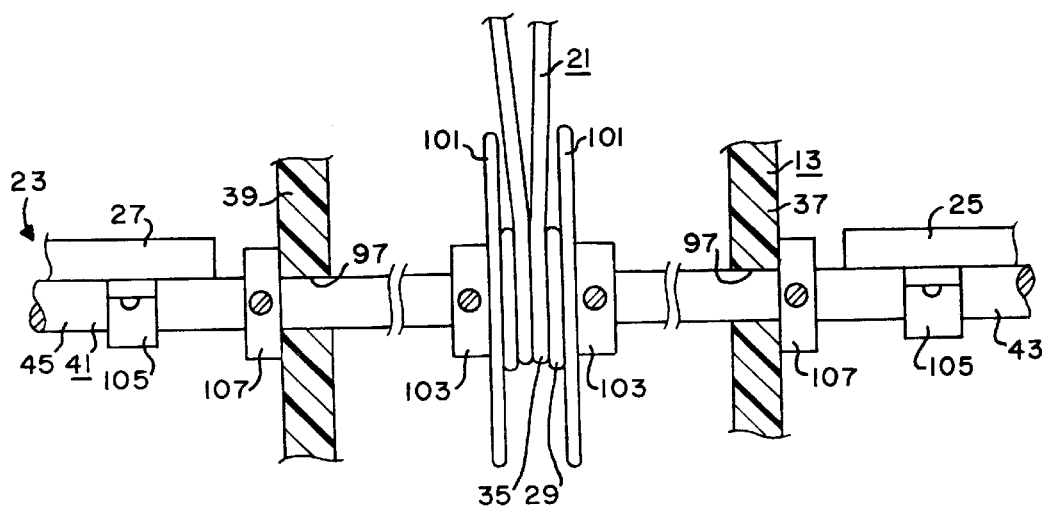
FIG. 4 is a sectional view of a duck decoy body and associated structure of the duck decoy system of the present invention, with portions thereof broken away for clarity.
Figure 5:
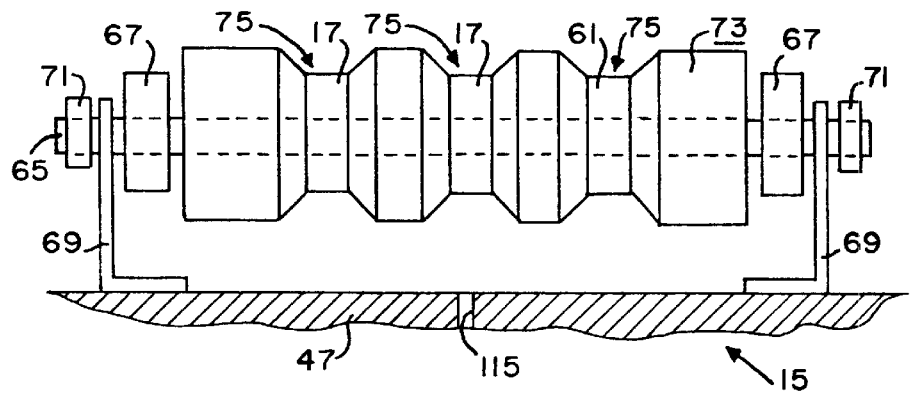
FIG. 5 is a sectional view of a p portion of the support member and associated structure of the duck decoy system of the present invention, with portions thereof broken away and omitted for clarity.
Figure 6:
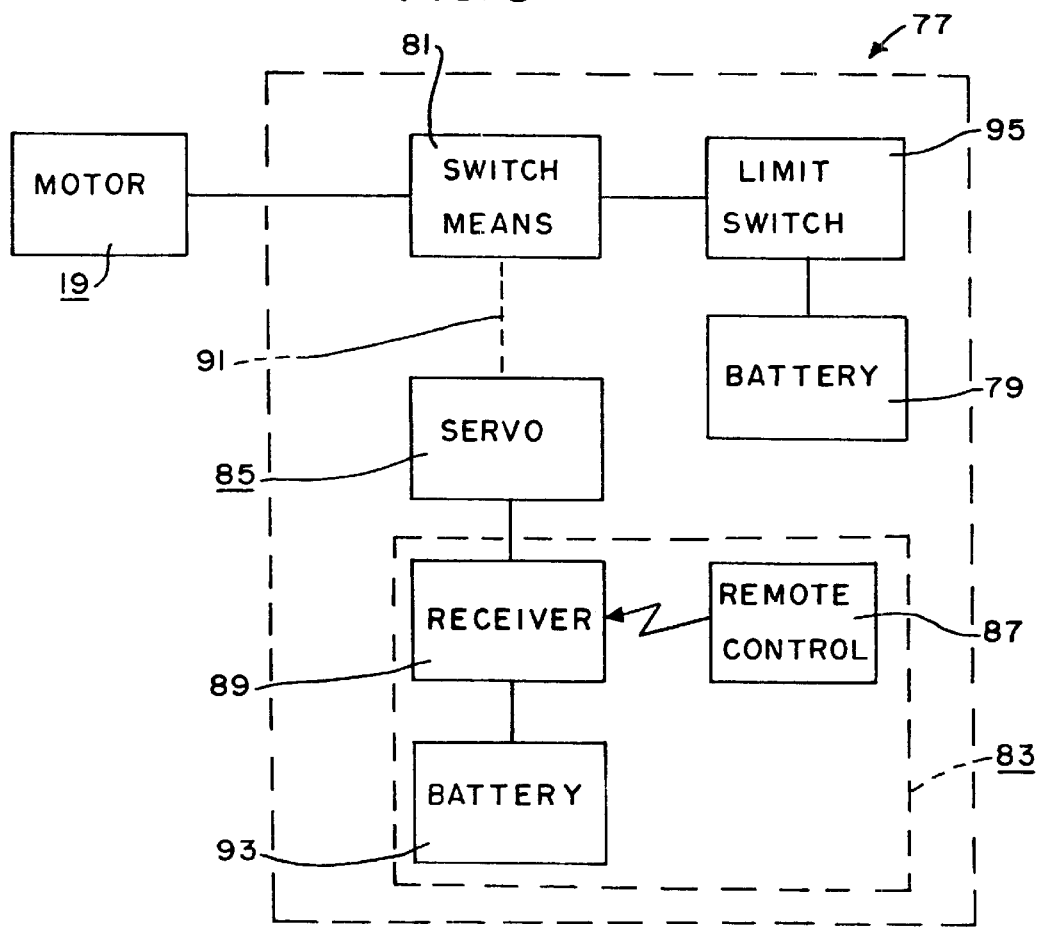
FIG. 6 is a block diagram of the electrical components of a preferred embodiment of the duck decoy system of the present invention.

A preferred embodiment of the duck decoy system of the present invention is shown in FIGS. 1–6, and identified by the numeral 11. The duck decoy system 11 is preferably used as a duck decoy system to simulate one or more descending or landing duck, especially a duck landing in timber, and, to simulate one or more ascending ducks.

The duck decoy system 11 of the present invention includes at least a one duck decoy body 13; a support member 15 for being positioned above the duck decoy body 13; and elevator means 16 for coupling the duck decoy body 13 to the support member 15 and for lowering the duck decoy body 13 downward from the support member 15 to simulate a landing duck. The duck decoy system 11 of the present invention preferably includes a pair of identical duck decoy bodies 13 (see, in general, FIG. 1), and may include additional duck decoy bodies (not shown) to simulate a flock of landing ducks, etc.

The elevator means 16 preferably includes a drive pulley 17 for each duck decoy body 13, a motor 19 for causing the drive pulley 17 to rotate, and a line 21 for being wound about the drive pulley 17 and for being coupled to each duck decoy body 13 so that rotation of the drive pulley 17 will cause the line 21 to unwind from each drive pulley 17 and allow each duck decoy body 13 to move downward from the support member 15 to simulate a landing duck.

The duck decoy system 11 preferably includes a movable duck decoy wing member 23 coupled to each duck decoy body 13 so that the duck decoy wing member 23 will simulate wing movement of a landing duck when rotation of the drive pulley 17 causes the line 21 to unwind from the drive pulley 17 and cause the duck decoy body 13 to move downward from the support member 15. More specifically, each duck decoy wing member 23 preferably includes a first duck decoy wing member 25 for simulating one wing (e.g., the right wing) of a duck decoy body 13, and a second duck decoy wing member 27 for simulating the other wing (e.g., the left wing) of the duck decoy body 13.

The duck decoy system 11 preferably includes a driven pulley 29 attached to each duck decoy body 13. More specifically, each duck decoy body 13 is preferably hollow and the driven pulley 29 is preferably mounted within the hollow cavity of the duck decoy body 13 at or near the gravitational center of the duck decoy body 13.

The drive pulley 17 is preferably rotatably coupled to the support member 15.

Each line 21 preferably has a first end 31 coupled to a drive pulley 17, a second end 33 attached to the support member 15, and a midportion 35 looped about a driven pulley 29 attached to a duck decoy body 13 so that rotation of the drive pulley 17 in a first direction (e.g., clockwise) will cause the first end 31 of the line to unwind from the drive pulley 17 and cause the driven pulley 29 to rotate to allow the duck decoy body 13 to move downward from the support member 15.

Each duck decoy body 13 preferably has a first or right side 37 and a second or left side 39, and the duck decoy system 11 preferably includes a rod or shaft 41 associated with each duck decoy body 13. Each shaft 41 preferably has a first end 43 extending outward of the first side 37 of a duck decoy body 13 and having a second end 45 extending outward of the second side 39 of the duck decoy body 13. A first duck decoy wing member 25 is preferably attached to the first end 43 of the shaft 41, a second duck decoy wing member 27 is preferably attached to the second end 45 of the shaft 41, and a driven pulley 29 is preferably attached to the shaft 41 intermediate the first and second ends 43, 45 thereof so that rotation of the driven pulley 29 will cause the shaft 41 and, thus, the first and second duck decoy wing members 25, 27 to rotate.

The support member 15 preferably includes a generally rectangular platform 47 and a pole 49 having an upper end 51 for being attached to the bottom of the platform 47 and a lower end 53 for being anchored to the ground in any manner now apparent to those skilled in the art such as, for example, by merely being pushed into the ground a sufficient depth to securely position the platform 47 a desired height, e.g., 4 to 15 feet (approximately 1.2 to 4.6 meters), above the ground or water surface. The platform 47 may consist simply of a rectangular piece of wood or the like. The pole 49 may consist of a plurality of interlocking pieces of metal pipe or conduit with the upper end 51 attached to the bottom of the platform 47 by a typical floor flange or the like. Each piece of conduit may be approximately 4 feet (1.2 meters) in length for easy portability.

The motor 19 is preferably mounted to the top side of the platform 47 by two 3 inch (7.62 centimeter) angle brackets 54 or the like, and preferably includes a drive shaft 55 for rotating when the motor 19 is activated. The duck decoy system 11 preferably includes drive means 57 between the drive shaft 55 and each drive pulley 17 for causing each drive pulley 17 to rotate in response to the rotation of the drive shaft 55. The drive means 57 preferably includes a first pulley 59 attached to the drive shaft 55 for being rotated by the drive shaft 55, a second pulley 61 coupled to each drive pulley 17 so that each drive pulley 17 will be rotated when the second pulley 61 is rotated, and an endless belt 63 extending between the first and second pulleys 59, 61 for causing the second pulley 61 to rotate when the first pulley 59 is rotated by the drive shaft 55 of the motor 19. The first pulley 59 preferably has a larger diameter than the second pulley 61 to cause the second pulley 61 to rotate at a faster revolution per minute than the first pulley 59. More specifically, the first pulley 59 preferably has a 7 inch (17.78 centimeter) outside diameter and the second pulley 61 preferably has a 1 inch (2.54 centimeter) outside diameter. The endless belt 63 may be constructed from a ¼ inch (0.635 centimeter) O-ring or the like.

The drive pulleys 17 and any the second pulley 61 are preferably rotatably coupled to the platform 47 of the support member 15 by way of an elongated rod 65, bearing members 67, and angle brackets 69. More specifically, the elongated rod 65 preferably extends through the drive pulleys 17 and second pulley 61, through the bearing members 67, through a normally vertical leg of each angle brackets 69 with the normally horizontal leg of each angle bracket 69 attached to the upper surface of the platform 47 by screws or the like (not shown). A set screw collar 71 is preferably attached to each end of the rod 65 to secure the rod 65 to the angle brackets 69 with the drive pulleys 17 and second pulley 61, and bearing members 67 secured between the two angle brackets 69.

The drive pulleys 17 and second pulley 61 are preferably constructed as a one-piece, integral unit from an elongated, cylindrical body member 73 having three spaced apart circular grooves 75 machined or otherwise formed in the outer surface thereof to create the respective pulleys. The body member 73 is preferably plastic with a 1 inch (2.54 centimeter) diameter and a 3.25 inch (8.255 centimeter) length. Each groove 75 may have a contour with a generally V-shaped cross-sectional area as clearly shown in FIG. 5.

The duck decoy system 11 preferably includes control means 77 for controlling the lowering and raising of each duck decoy body 13. More specifically, the control means 77 allows a user of the duck decoy system 11 to activate and deactivate the motor 19 and to reverse the direction of rotation of the motor 19 (i.e., the direction of rotation of the drive shaft 55) to selectively lower and raise each duck decoy body 13. Preferably, the motor 19 consist of a typical direct current electric motor, and the control means 77 includes a battery 79 to provide electrical energy to the motor 19, and means for allowing a user of the duck decoy system 11 to control the passage of electrical energy from the battery 79 to the motor 19. The motor 19 is preferably rated for 50 pounds pick-up and 105 revolutions per minute. The control means 77 preferably includes switch means 81 for making or breaking a circuit between the battery 79 and motor 19, and for reversing the direction of rotation of the motor 19. The switch means 81 may consist of a typical double pole, double throw switch wired to the battery 79 and motor 19 to form a reversing circuit for allowing the polarity of the armature or field of the motor 19 to be reversed, etc., as will now be apparent to those skilled in the art. On the other hand, the switch means 81 may include four limit switches wired to the battery 79 and motor 19 to form such a reversing circuit. In either case, the control means 77 preferably includes remote control means 83 and a servo-mechanism 85 or the like for co-acting to activate the motor 19 from a location remote from the support member 15. The remote control means 83 preferably includes a hand-held transceiver 87 for being controlled by a user of the duck decoy system 11, and a receiver 89 for being controlled by the transceiver 87 and for controlling the servomechanism 85. The servomechanism 85 preferably includes an actuator arm 91 for mechanically engaging the switch means 81 to make or break the circuit between the battery 79 and motor 19, and to reverse the direction of rotation of the motor 19, etc. Thus, a user of the duck decoy system 11 can activate the hand-held transceiver 87 to cause the servomechanism 85, the receiver 89, to move the actuator arm 91 to an off position in which the circuit between the battery 79 and motor 19 is broken, to a down position in which the circuit between the battery 79 and motor 19 is made in a manner which caused the drive shaft 55 to rotate in a direction which lowers the duck decoy body 13, or to an up position in which the circuit between the battery 79 and motor 19 is made in a manner which caused the drive shaft 55 to rotate in a direction which pulls the duck decoy body 13 up toward the platform 47. The hand-held transceiver 87 typically includes a self-contained battery or the like (not shown). The receiver 89 may be electrically coupled to a battery 93 or may be electrically coupled to the battery 79, etc., as will now be apparent to those skilled in the art. The control means 77 preferably includes a limit switch 95 positioned in the circuit between the battery 79 and motor 19 for breaking the circuit between the battery 79 and motor 19 in the event the duck decoy body 13 is pulled too close to the platform 47. More specifically, a limit switch 95 may be positioned on the bottom of the platform 47 in a position to be opened by actual contact with a duck decoy body 13 in the event a duck decoy body 13 is pulled too close to the platform 47 (e.g., in the event the user of the duck decoy system 11 forgets to move the controls of the hand-held transceiver 87 from the up position, the limit switch 95 will break the circuit between the battery 79 and motor 19 to prevent a duck decoy body 13 from hitting the bottom of the platform 47). When the duck decoy system 11 includes multiple duck decoy bodies, a separate limit switch 95 is preferably provided for each such duck decoy body.

The actual construction and operation of the duck decoy system 11 may vary as will now be apparent to those skilled, in the art. Preferably, the duck decoy system 11 is designed to simulate one or more ducks landing in timber, and each duck decoy body 13 preferably consists of a standard, hollow, off-the-shelf mallard duck decoy, modified by cutting the back so that a portion thereof can be peeled back to allow access to the hollow interior thereof, and drilling a hole 97 in each side 37, 39 thereof, opposite one another to allow the shaft 41 to extend therethrough. The shaft 41 preferably consists of a ⅛ inch (0.3175 centimeter) stainless steel rod. For a normal size decoy, the shaft 41 may be about 14 inches (35.56 centimeters) long. Inside the hollow interior of the duck decoy body 13, the driven pulley 29 is attached to the shaft 41, centered between a pair of washers 101 (see FIG. 4). Each driven pulley 29 preferably consists of a sheave, made of a synthetic resinous plastic material such as Delrin® with a ⅛ inch (0.3175 centimeters) bore for receiving the shaft 41 and a ¾ inch (1.905 centimeter) outside diameter. The washers 101 are preferably made of fiberglass with a relatively large 2 inch (5.08 centimeters) outside diameter. Locking collars 103 are preferably secured to the shaft 41 on opposite sides of the washers 101 to hold the driven pulley 29 firmly between the washers 101. The washers 101 act as guides for the line 21, to ensure that the midportion 35 of the line 21 stays on the driven pulley 29. The wing members 25, 27 are attached to opposite ends of the shaft 41, outside each duck decoy body 13, by standard ⅛ inch (0.3175 centimeter) adhesive plastic clamps 105 or the like. Weather proof glue is also preferably used to ensure that the wing members 25, 27 are firmly secured to the shaft 41. The wing members 25, 27 may be constructed from 1/16" (0.15875 centimeter) thick sheet material, e.g., a gray polyvinyl chloride (PVC) sheet material), cut into oval shapes. One side of each wing member 25, 27 may be painted or otherwise made a dark color while the other side may be painted or otherwise made a light color. Locking collars 107 are preferably secured to the shaft 41 on opposite sides of a duck decoy body 13, immediately when the shaft 41 penetrates both sides of the duck decoy body 13 to keep the shaft 41 from being pulled out of the duck decoy body 13. Two relatively small holes 109 are drilled or otherwise formed through the top of the duck decoy body 13, lined up with the driven pulley 29. One end of a coil spring member 111 is attached to one of the holes 109 with the body of the coil spring member 111 located outside of the duck decoy body 13. The midportion 35 of a line 21 passes through the body of the coil spring member 111, through one hole 109, loops the driven pulley 29, preferably twice, then goes out the other hole 109, and then goes back through the body of the coil spring member 111 (see FIG. 3). The coil spring member 111, with the line 21 thus arranged, prevents any slack in the line 21 from reaching the driven pulley 29. The second end 33 of the line 21 extends from the body of the coil spring member 111 to the bottom of the platform 47. The second end 33 of the line 21 is preferably tied off or otherwise secured to a standard eyebolt 113 or the like that is screwed into the bottom of the platform 47. The first end 31 of the line 21 extends from the body of the coil spring member 111 up through an aperture 115 in the platform 47, and to a drive pulley 17. The aperture 115 for the line 21 from one duck decoy body 13 (e.g., the duck decoy body 13 on the left in FIG. 1) may be substantially directly beneath the corresponding drive pulley 17, while the aperture 115 for other duck decoy bodies 13 (e.g., the duck decoy body 13 on the right in FIG. 1) may be offset from the associated drive pulley 17 and the first end 31 of that line 21 may be guided to that associated drive pulley 17 via one or more guide pulleys 116 mounted on top of the platform 47. The first end 31 of each line 21 is connected to a drive pulley 17 so that when the drive pulley 17 is rotated, the line 21 will either be wound about the drive pulley 17 to lift the duck decoy body 13 toward the platform 47 (thus simulating an ascending duck) or be unwound from the drive pulley 17 to lower the duck decoy body 13 from the platform 47 (thus simulating a descending or landing duck), depending on the direction of rotation of the drive pulley 17 (i.e.,depending on whether the drive pulley 17 is rotating clockwise or counterclockwise). The line 21 preferably consists of a strong, clear monofilament line (e.g., typical fishing line) or the like. A pair of leg and webbed feet members 117 are preferably mounted to the bottom of each modified duck decoy body 13. The leg and webbed feet members 117 are preferably painted or otherwise colored orange, and may be constructed out of plastic and bolted or otherwise securely attached to the bottom of the duck decoy body 13, etc. The modified duck decoy body 13 will float.

Although the present invention has been described and illustrated with respect to a preferred embodiment and a preferred use therefor, it is not to be so limited since modifications and changes can be made therein which are within the full intended scope of the invention.

What is claimed is:

1. A duck decoy system for simulating a landing duck; said duck decoy system comprising:
   (a) a duck decoy body;
   (b) a support member for being positioned above said duck decoy body;
   (c) elevator means for coupling said duck decoy body to said support member and for lowering said duck decoy body downward from said support member to simulate a landing duck; said elevator means including a drive pulley, a motor for causing said drive pulley to rotate, and a line for being wound about said drive pulley and for being coupled to said duck decoy body so that rotation of said drive pulley will cause said line to unwind from said drive pulley and allow said duck decoy body to move downward from said support member to simulate a landing duck; said drive pulley of said elevator means being rotatably coupled to the support member; said motor of said elevator means including a drive shaft for rotating when the motor is activated; and (d) drive means between said drive shaft and said drive pulley for causing said drive pulley to rotate in response to the rotation of said drive shaft; said drive means including a first pulley attached to said drive shaft for being rotated by said drive shaft, a second pulley coupled to said drive pulley so that said drive pulley will be rotated when said second pulley is rotated, and a belt extending between said first and second pulleys for causing said second pulley to rotate when said first pulley is rotated by said drive shaft.

2. The duck decoy system of claim 1 in which said first pulley has a larger diameter than said second pulley to cause said second pulley to rotate at a faster revolution per minute that said first pulley.

3. A duck decoy system for simulating a landing duck; said duck decoy system comprising:

(a) a duck decoy body;

(b) a support member for being positioned above said duck decoy body;

(c) elevator means for coupling said duck decoy body to said support member and for lowering said duck decoy body downward from said support member to simulate a landing duck; said elevator means including a drive pulley; a motor for causing said drive pulley to rotate; and a line for being wound about said drive pulley and for being coupled to said duck decoy body so that rotation of said drive pulley will cause said line to unwind from said drive pulley and allow said duck decoy body to move downward from said support member to simulate a landing duck; said elevator means including a driven pulley attached to said duck decoy body; said drive pulley being coupled to said support member; said line having a first end coupled to said drive pulley, a second end attached to said support member, and a midportion looped about said driven pulley so that rotation of said drive pulley will cause said first end of said line to unwind from said drive pulley and cause said driven pulley to rotate to allow said duck decoy body to move downward from said support member; and (d) a movable duck decoy wing member coupled to said duck decoy body so that said duck decoy wing member will simulate wing movement of a landing duck when rotation of said drive pulley causes said line to unwind from said drive pulley and cause said duck decoy body to move downward from said support member.

4. The duck decoy system of claim 3 in which said duck decoy body has a first side and a second side, in which is included a shaft having a first end extending outward of said first side of said duck decoy body and having a second end extending outward of said second side of said duck decoy body, and in which said duck decoy wing member includes a first duck decoy wing member attached to said first end of said shaft and a second duck decoy wing member attached to said second end of said shaft; said driven pulley being attached to said shaft so that rotation of said driven pulley will cause said shaft and said first and second duck decoy wing members to rotate.

5. A duck decoy system for simulating a descending and ascending duck; said duck decoy system comprising:

(a) a duck decoy body having a first side and a second side;

(b) a shaft having a first end extending outward of said first side of said duck decoy body and having a second end extending outward of said second side of said duck decoy body;

(c) a first duck decoy wing member attached to said first end of said shaft;

(d) a second duck decoy wing member attached to said second end of said shaft;

(e) a driven pulley attached to said shaft;

(f) a support member for being positioned above said duck decoy body;

(g) a first drive pulley coupled to said support member;

(h) a motor for rotating said first drive pulley in a first direction and in a second direction; and (i) a line having a first end coupled to said first drive pulley, a second end attached to said support member, and a midportion looped about said driven pulley so that rotation of said first drive pulley in said first direction will cause said first end of said line to unwind from said first drive pulley and allow said duck decoy body to move downward from said support member to simulate a descending duck, so that rotation of said first drive pulley in said second direction will cause said first end of said line to wind about said first drive pulley and cause said duck decoy body to move upward toward said support member to simulate an ascending duck, and cause said duck decoy wing members to rotate to simulate the wing movements of a descending or ascending duck.

6. The duck decoy system of claim 5 in which is included a second duck decoy body, a second drive pulley coupled to said support member and for being rotated by said motor, and a second line having a first end coupled to said second drive pulley, a second end attached to said support member, and a midportion coupled to said second duck decoy body so that rotation of said second drive pulley in said first direction will cause said first end of said second line to unwind from said second drive pulley and allow said second duck decoy body to move downward from said support member to simulate a descending duck, so that rotation of said second drive pulley in said second direction will cause said first end of said second line to wind about said second drive pulley and cause said second duck decoy body to move upward toward said support member to simulate an ascending duck.

7. The duck decoy system of claim 5 in which is included remote control means for activating said motor to cause said first drive pulley to rotate in either said first or second directions from a location remote from said support member.

* * * * *